United States Patent [19]
Kimura et al.

[11] Patent Number: 5,099,167
[45] Date of Patent: Mar. 24, 1992

[54] VIBRATION WAVE DRIVEN MOTOR

[75] Inventors: Atsushi Kimura, Yokohama; Hiroshi Seki, Urawa, both of Japan

[73] Assignee: Canon Kabushiki Kaisha, Tokyo, Japan

[21] Appl. No.: 489,199

[22] Filed: Mar. 6, 1990

[30] Foreign Application Priority Data

Mar. 7, 1989 [JP] Japan .................................. 1-54538

[51] Int. Cl.$^5$ ............................................ H01L 41/08
[52] U.S. Cl. .................................................. 310/323
[58] Field of Search .................................. 310/328, 323

[56] References Cited

U.S. PATENT DOCUMENTS 4,495,432  1/1985  Katsuma et al. ...................... 310/328
4,786,836  11/1988  Tokushima ...................... 310/328 X
4,810,923  3/1989  Tsukimoto et al. ............. 310/328 X

FOREIGN PATENT DOCUMENTS 60-22478  2/1985  Japan .................................. 310/323
0148387  8/1985  Japan .................................. 310/323
0162487  8/1985  Japan .................................. 310/323

Primary Examiner—Mark O. Budd
Attorney, Agent, or Firm—Fitzpatrick, Cella, Harper & Scinto

[57] ABSTRACT

In a vibration wave driven motor disclosed herein, the arcuate portions of the vibration member thereof are formed into a shape in which flexural rigidity differs between the inner side and the outer side thereof, or a shape in which the torsional rigidity of the straight portions of the vibration member is made higher than the torsional rigidity of the arcuate portions, whereby a torsion component produced in the straight portions is made small by the straight portions.

16 Claims, 4 Drawing Sheets

VIBRATION WAVE DRIVEN MOTOR

BACKGROUND OF THE INVENTION

1. Field of the Invention

This invention relates to a vibration wave driven motor for use in a camera, business machine or the like, and particularly to the vibration member thereof.

2. Related Background Art

A motor has already been proposed in which at least two groups of piezo-electric elements spatially deviated from each other are provided on a resilient member formed of a metal or like material and electrical signals differing in phase from each other are applied to the respective groups of piezo-electric elements, whereby a travelling wave is generated on the resilient member and a moving member which is in pressure contact with the resilient member is driven by the travelling wave.

Also, such motor has a feature that its torque during low speeds is relatively great and therefore, has been applied to visual instruments in recent years.

The shape of the vibration member of such vibration wave driven motor, i.e., the vibration member comprising piezo-electric elements and a resilient member, is generally classified into a circular shape and a non-circular shape, e.g. an elliptical shape, and in a vibration member of a non-circular shape, there has arisen a problem that torsion is produced in vibration and reduces the efficiency of the motor and noise is produced from the portion of contact between the vibration member and the moving member.

This point will further be described with reference to FIG. 8 of the accompanying drawings.

The reference numeral 1 designate the aforedescribed resilient member. The resilient member 1 used in the conventional vibration wave driven motor is of a predetermined cross-sectional shape as shown in FIG. 8. The reference numeral 2 denotes piezo-electrice elements as electro-mechanical energy conversion elements. The polarization and arrangement of the piezo-electric elements 2 and the manner of application of electrical signals to the piezo-electric elements 2 are as in the past. In the case of FIG. 8, the piezo-electric elements 2 are vibrated in a vertical direction to thereby generate a travelling wave on the elliptical resilient member 1, and the straight portions of the resilient member 1 are used to feed a sheet (not shown) rectilinearly. Slits are provided in the resilient member 1 to increase the sheet feeding speed.

However, the circumferential length of the travelling wave generated on the resilient member 1 differs between the inner diameter and the outer diameter of the arcuate portions of the elliptical resilient member and therefore, other torsion component than required vibration has been produced.

FIGS. 9 and 10 of the accompanying drawings illustrate the torsion of the vibration produced on the resilient member 1, and represent the contour lines of displacement in a direction perpendicular to the piezo-electric elements 2 caused in the resilient member 1 by the vibration of the group A (not shown) and the group B (not shown) of the piezo-electric elements which have been found by an eigenvalue analysis using the finite element method. As regards the amount of displacement, maximum displacement is normalized as "1".

As is clearly shown in an area on the resilient member which is indicated, for example, by dotted line A in FIG. 10, in the conventional vibration wave driven motor, the amplitude of vibration has been high on the outer peripheral side (the right side) of the elliptical resilient member 1, and as regards also the displacement of vibration generated on the resilient member by another group of piezo electric element shown in FIG. 9, as is clearly shown in an area indicated by dotted line a, the amplitude of the vibration has been high on the outer peripheral side of the resilient member 1 and low on the inner peripheral side thereof.

That is, the vibration on the resilient member of the conventional non-circular vibration wave driven motor has been in a state in which displacement in the same area is not equal, in other words, in a state in which the vibration on the resilient member is distorted.

This has led to the disadvantage that the efficiency of the motor is low as previously described and sound is produced between the vibration member and a member moving relative to the vibration member, for example, a rotor.

SUMMARY OF THE INVENTION

It is an object of the present invention to provide a new and improved vibration wave driven motor.

It is another object of the present invention to provide a vibration wave driven motor which is high in efficiency and which suffers very little from the production of sound.

It is still another object of the present invention to provide a vibration wave driven motor in which the torsion of vibration is small.

Other objects of the present invention will become apparent from the following detailed description of the invention.

To achieve the above objects, the present invention is characterized in that the arcuate portions of a vibration member are of a shape in which flexural rigidity differs between the inner side and the outer side thereof, thereby mitigating the torsion component in the straight portions of the vibration member which are used for driving.

The present invention is also characterized in that the straight portions of the vibration member are of a shape in which the torsional rigidity thereof is made higher than the torsional rigidity of the arcuate portions, whereby the torsion component produced in the straight portions is made small by the straight portions.

DESCRIPTION OF THE PREFERRED EMBODIMENTS

Figure 1:
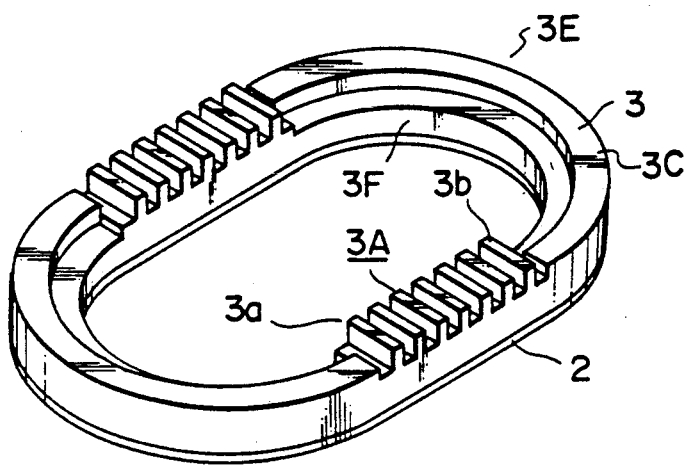
FIG. 1 is a perspective view showing a first embodiment of the vibration member of a vibration wave driven motor to which the present invention is applied.
Figure 8:
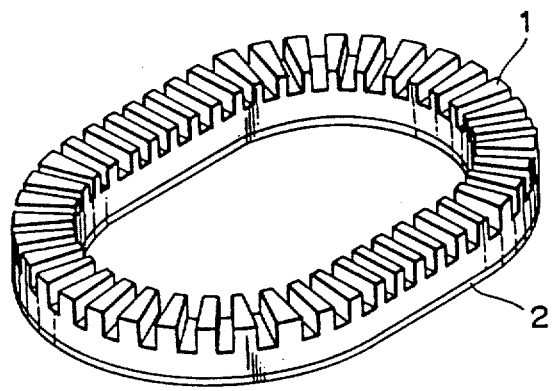
FIG. 8 is a perspective view showing a conventional vibration member.

FIG. 1 is a perspective view showing a first embodiment of the present invention, and in this figure, portions similar to those in FIG. 8 are given similar reference numerals. A control circuit for piezo-electric elements 2 which is not shown in FIG. 1, and a sheet or the like which is in pressure contact with an elliptical resilient member 3 are the same as conventional ones and therefore need not be described herein.

Figure 2:
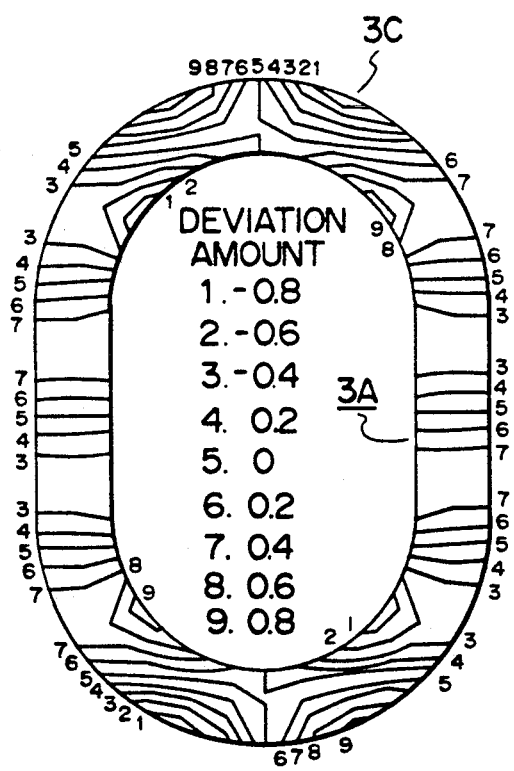
FIGS. 2 and 3A show the contour lines of the displacement of the two standing wave modes thereof found by an eigenvalue analysis using the finite element method.
Figure 3A:
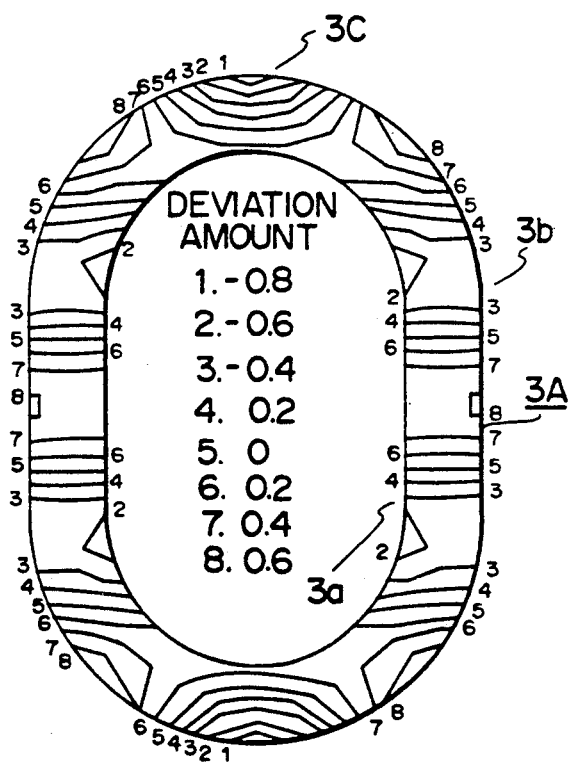
Figure 3B:
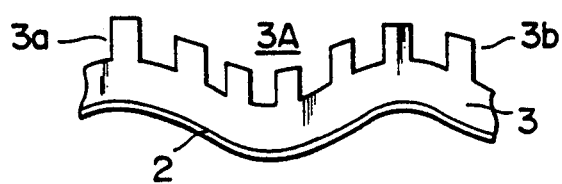
FIG. 3B shows the state of vibration during the driving of the resilient member 3 of FIG. 1.

A resilient member 3 forming the vibration member of the present embodiment is of a shape in which slits in the arcuate portions thereof which are not used for driving are eliminated and instead, a level difference is provided in the height of the cross-section. This is for the purpose of making the height of the inner side smaller than the height of the outer side, and making the flexural rigidity of the inner side smaller than the flexural rigidity of the outer side. FIGS. 2 and 3A show the contour lines of displacement on the resilient member 3 caused by the vibration of the group A (not shown) and the group B (not shown) of piezo-electric elements 2 which have been found by an eigenvalue analysis using the finite element method when the vibration member comprising elements 2 and 3 is formed into such a shape, and FIG. 3B shows the state of vibration during the driving of the resilient member 3 of FIG. 1. As can be seen from these figures, the torsion of the straight portions of the resilient member is null. In these figures, torsion is present in the arcuate portion 3C of the resilient member, but this portion is not used for the driving of a sheet (not shown) as a driven member and only the straight portions 3A are used for said driving and therefore, there is no problem.

Figure 4A:
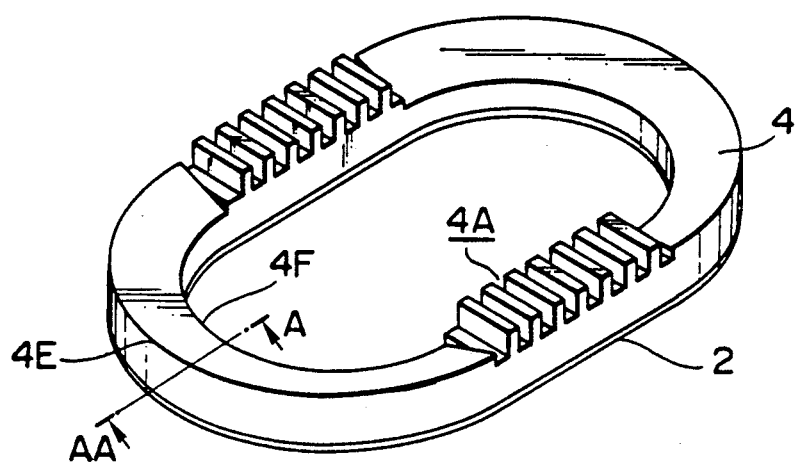
FIG. 4A is a perspective view showing a second embodiment of the present invention.
Figure 4B:
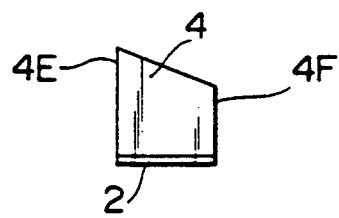
FIG. 4B is a cross-sectional view of the vibration member of FIG. 4A taken along line A—AA in FIG. 4A.

FIGS. 4A and 4B show only the essential portions of a second embodiment of the vibration wave driven motor to which the present invention is applied. In this embodiment, a vibration member 4 is of a shape in which the cross-sectional shape of the arcuate portions is trapezoidal as shown in FIG. 4B and the height thereof is continuously varied in the diametrical direction thereof, and as in the FIG. 1 embodiment, the flexural rigidity of the inner side of the vibration member is made smaller than the flexural rigidity of the outer side thereof so as to eliminate the torsion component in the straight portions 4A thereof. Of course, again in the case of this embodiment, a sheet (not shown) is fed by the straight portions 4A or relative movement is caused between a member which is in contact with the straight portion 4A and the vibration member 4, 2 by a travelling wave generated on the straight portions 4A.

Figure 5:
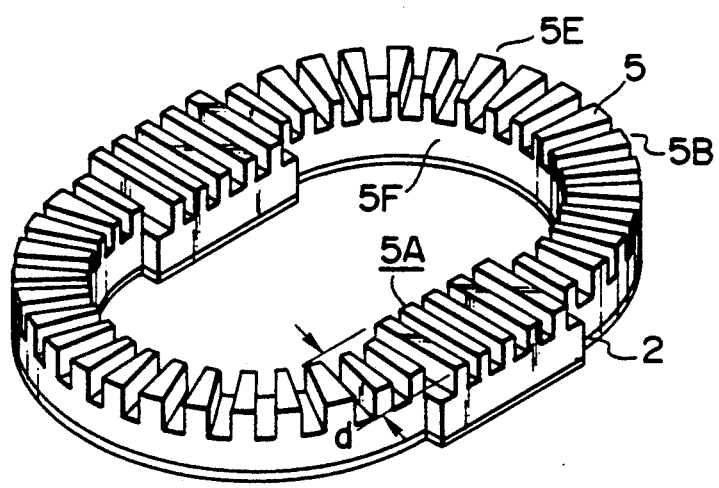
FIG. 5 is a perspective view showing a third embodiment of the present invention.

FIG. 5 shows a third embodiment of the present invention in which the width d of the cross-section of the straight portions 5A of the conventional resilient member shown in FIG. 8 is made greater than the width of the other portions to thereby eliminate the torsion component in the straight portions 5A. That is, the flexural rigidity of the straight portions 5A is made great (high) so that the influence of the torsion component produced in the arcuate portion 5B may hardly be transmitted to the straight portions 5A, whereby the torsion component in the straight portions 5A is eliminated.

According to the present embodiment, the vibration member is formed into a shape in which the flexural rigidity of the inner side (the inner diameter) 3F, 4F of the arcuate portion is made to differ from the flexural rigidity of the outer side (the outer diameter) 3E, 4E thereof, or a shape which can enhance the rigidity of the straight portions 5A and therefore, it becomes possible to eliminate the other torsion component than the vibration mode required for driving, and prevent a reduction in efficiency and the production of sound.

Modification

Figure 6:
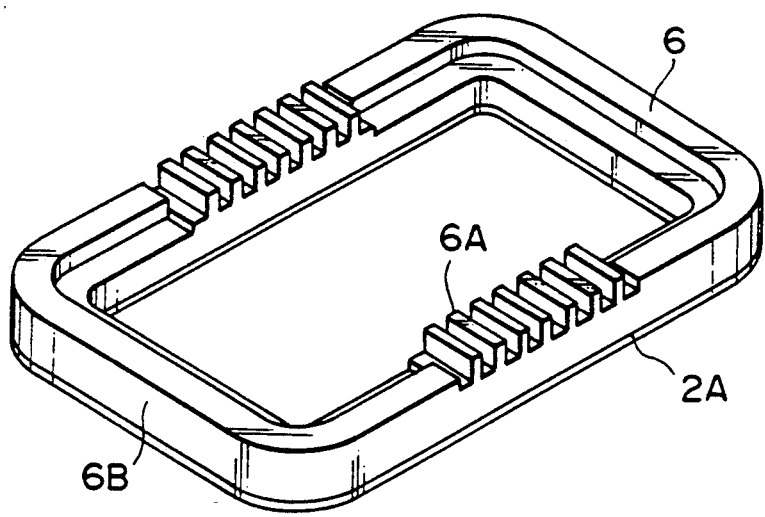
FIGS. 6 and 7 are perspective views showing modifications of the present invention.
Figure 7:
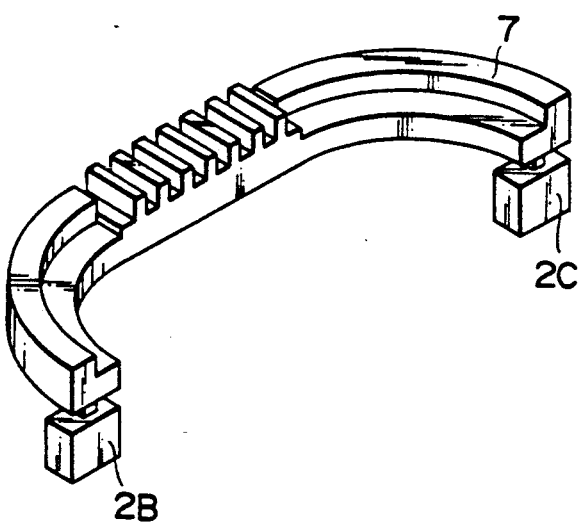
Figure 1:
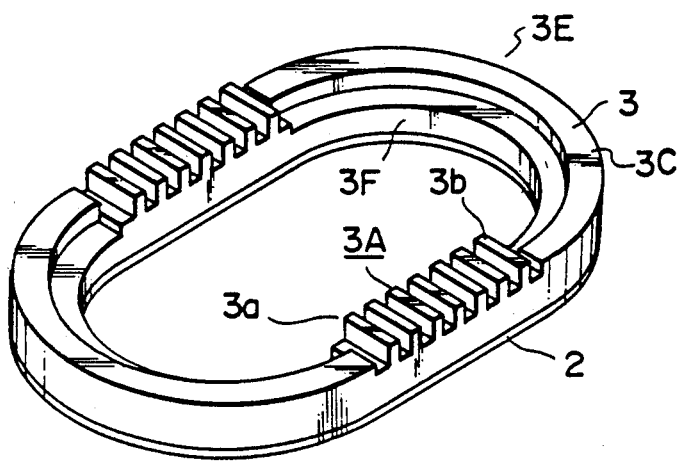
Figure 2:
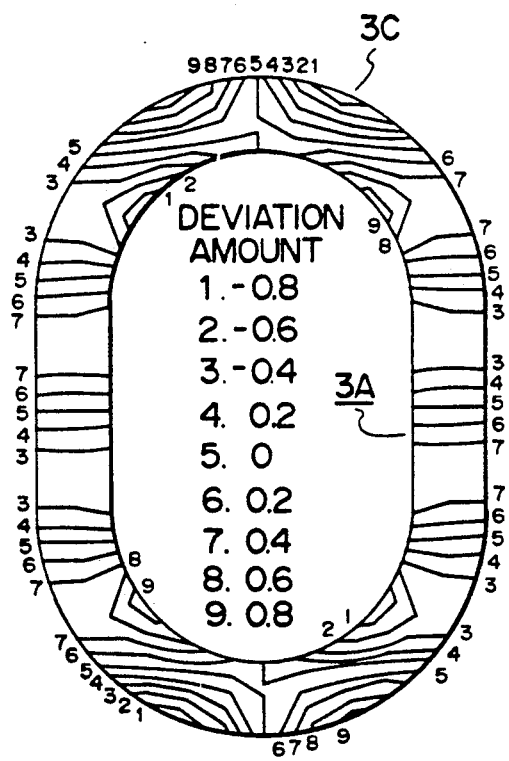
Figure 3A:
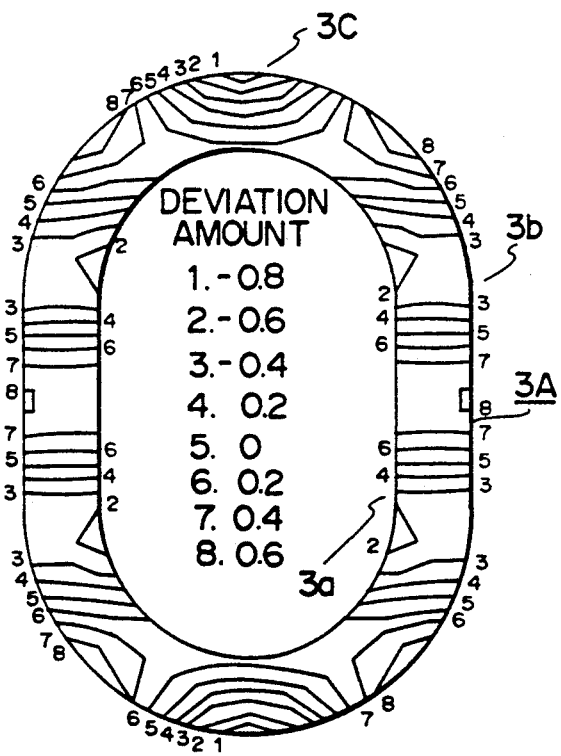
Figure 3B:
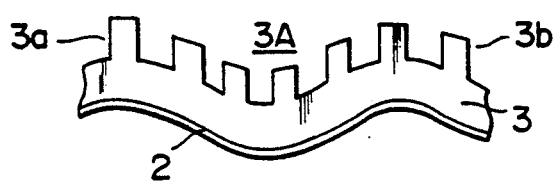

The above embodiments have been described with respect to elliptical vibration members, whereas the present invention is not restricted thereto, but may be equally applied to a rectangular vibration member 6, 2A as shown in FIG. 6 (the straight portions 6A not used for driving of which may be of the same cross-sectional shape as the arcuate portion 6B). There is also a vibration wave driven motor in which a vibration member is straight, and where the vibration member is made into a vibration member 7 having both (or one) end thereof formed into an arcuate shape as shown in FIG. 7 so as to be advantageous in terms of space, the problem of torsion will likewise arise, but the present invention is equally applicable to such a vibration member. In FIG. 7, the reference character 2B designates a conventional vibration impacting piezo-electric element, and the reference character 2C denotes a conventional vibration absorbing piezo-electric element.

Also, in the present embodiment, there has been shown a vibration member having slits (having comb-tooth-like contact portions), but of course, it is possible to obtain a similar effect in the case of a vibration member having arcuate portions, but not slits.

Further, in the first and second embodiments, the cross-sectional shape of the arcuate portions is varied so as to eliminate the torsion component in the straight portions, but a construction using materials differing in rigidity for the inner side and the outer side of the arcuate portions may also be adopted.

As described above, according to the present invention, the arcuate portions of the vibration member are formed into a shape in which flexural rigidity differs between the outer side and the inner side thereof, whereby the torsion component in the straight portions used for driving is mitigated, and the straight portions of the vibration member are formed into a shape in which the torsional rigidity thereof is made higher than the torsional rigidity of the arcuate portions, whereby the torsion component produced in the arcuate portions is made small by the straight portions, and therefore it becomes possible to eliminate the torsion component of vibration and prevent a reduction in efficiency and the production of sound.

What is claimed is:

1. A vibration wave apparatus, comprising:
   (a) an electro-mechanical energy conversion means; and
   (b) a vibration member provided in contact with said conversion means, said conversion means producing a travelling wave in said vibration member in response to an electrical signal applied to said conversion means, said vibration member having at least one straight portion and at least one arcuate portion, said straight portion and said arcuate portion being formed so that torsional rigidity of said straight portion is greater than torsional rigidity of said arcuate portion.

2. A vibration wave apparatus according to claim 1, wherein said vibration member is shaped as a loop and the width of said straight portion is greater than that of said arcuate portion.

3. A vibration wave apparatus according to claim 2, wherein said vibration member is shaped elliptically.

4. A vibration wave driven apparatus, comprising:
  (a) an electro-mechanical energy conversion means;
  (b) a vibration member provided in contact with said conversion means, said conversion means producing a vibration wave in said vibration member in response to an electrical signal applied to said conversion means, said vibration member having at least one straight portion and at least one arcuate portion, said straight portion and said arcuate portion being arranged in such a manner that torsional rigidity of said straight portion is made greater than that of said arcuate portion; and
  (c) a contact member provided in contact with said vibration member to receive the vibration wave, said vibration wave causing relative movement between said vibration member and said contact member.

5. A vibration wave apparatus according to claim 4, wherein said vibration member is shaped as a loop and the width of said straight portion is greater than that of said arcuate portion.

6. A vibration wave apparatus according to claim 5, wherein said vibration member is shaped elliptically.

7. A vibration wave driven motor, comprising:
  (a) an electro-mechanical energy conversion means;
  (b) a vibration member provided in contact with said conversion means, said conversion means producing a vibration wave in said vibration member in response to an electrical signal applied to said conversion means, said vibration member including at least one straight portion with a predetermined width and at least one arcuate portion with a predetermined width, the flexural rigidity of an inner peripheral side of said arcuate portion being different from the flexural rigidity of an outer peripheral side thereof, and the flexural rigidity of an inner peripheral side of said straight portion being the same as the flexural rigidity of an outer peripheral side thereof.

8. A vibration wave driven motor according to claim 7, wherein the flexural rigidity of the inner peripheral side is lower than that of the outer peripheral side.

9. A vibration wave driven motor according to claim 7, wherein material of the inner peripheral side and material of the outer peripheral side are different from each other.

10. A vibration wave driven motor according to claim 7, wherein a height of the inner peripheral side is higher than that of the outer peripheral side.

11. A vibration wave driven motor according to claim 7, wherein the arcuate portion is shaped such that the height gradually increases from the inner peripheral portion toward the outer peripheral portion.

12. A vibration wave driven motor according to claim 7, wherein said vibration member is shaped elliptically.

13. A vibration wave driven motor, comprising:
  (a) a contact member; and
  (b) a vibration member provided in contact with said contact member for generating a vibration wave in response to an applied electrical signal, said vibration member including at least one straight portion with a predetermined width and at least one arcuate portion with a predetermined width, the flexural rigidity of an inner peripheral side of said arcuate portion being different from the flexural rigidity of an outer peripheral side thereof, and the flexural rigidity of an inner peripheral side of said straight portion being the same as the flexural rigidity of an outer peripheral side thereof.

14. A vibration wave driven motor according to claim 13, wherein said vibration member has a pair of straight portions with a predetermined length and width and a pair of arcuate portions arranged so as to interpose said straight portions therebetween.

15. A vibration wave driven motor according to claim 13, wherein said vibration member has a shape which has four straight portions with a predetermined width and four arcuate portions connecting each straight portion.

16. A vibration device for a vibration wave driven motor, wherein a vibration member is provided for generating a vibration in response to an applied electrical signal, said vibration member including at least one straight portion with a predetermined width and at least one arcuate portion with a predetermined width, the flexural rigidity of an inner peripheral side of said arcuate portion being different from the flexural rigidity of an outer peripheral side thereof, and the flexural rigidity of an inner peripheral side of said straight portion being the same as the flexural rigidity of an outer peripheral side thereof.

* * * * *

UNITED STATES PATENT AND TRADEMARK OFFICE
CERTIFICATE OF CORRECTION

PATENT NO. : 5,099,167

DATED : March 24, 1992

INVENTOR(S) : Atsushi Kumura, et al

It is certified that error appears in the above-identified patent and that said Letters Patent is hereby corrected as shown below:

On title page, item [75] Inventors: should read, --Atsushi, Kimura, Yokohama; Hiroyuki Seki, Urawa, both of Japan--.

Figure 9:
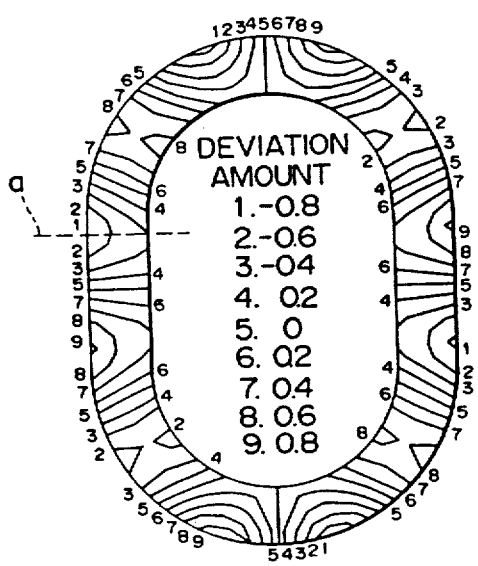
FIGS. 9 and 10 show the contour lines of the displacement of the two standing wave modes thereof found by an eigenvalue analysis using the finite element method.
Figure 10:
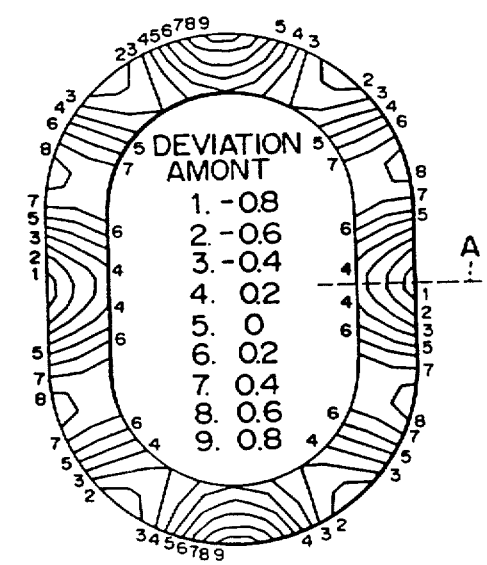

Drawing sheet 4 of 4 should be deleted to be replaced with drawing sheet 4 of 4, consisting of Figs. 8-10, as shown on the attached page.

UNITED STATES PATENT AND TRADEMARK OFFICE
CERTIFICATE OF CORRECTION

PATENT NO. : 5,099,167

DATED : March 24, 1992

INVENTOR(S) : Kimura et al.

It is certified that error appears in the above-identified patent and that said Letters Patent is hereby corrected as shown below:

COLUMN 2

Line 6, "piezo electric element" should read --piezo-electric elements--.

COLUMN 5

Line 27, "vibration wave apparatus" should read --vibration wave driven apparatus--.

Line 31, "vibration wave apparatus" should read --vibration wave driven apparatus--.

Signed and Sealed this

Thirtieth Day of March, 1993

Attest:

STEPHEN G. KUNIN

*Attesting Officer*      *Acting Commissioner of Patents and Trademarks*